Nov. 25, 1958 V. R. HANFORD 2,861,405
SEALED PACKAGE AND METHOD OF MAKING THE SAME
Filed Dec. 6, 1956
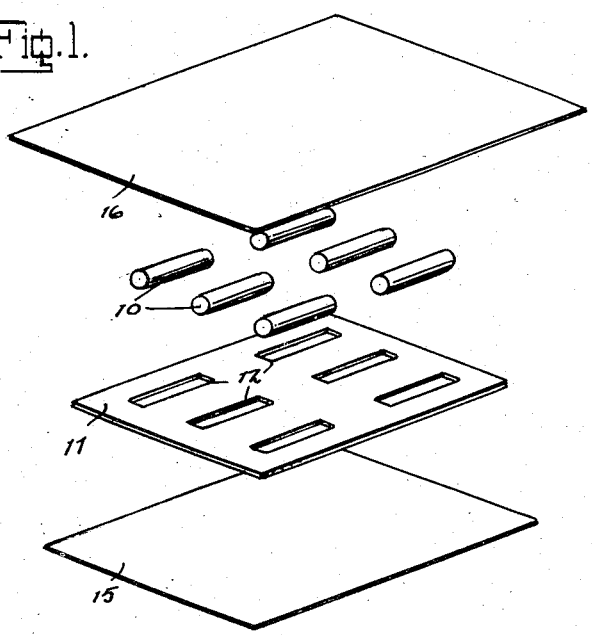
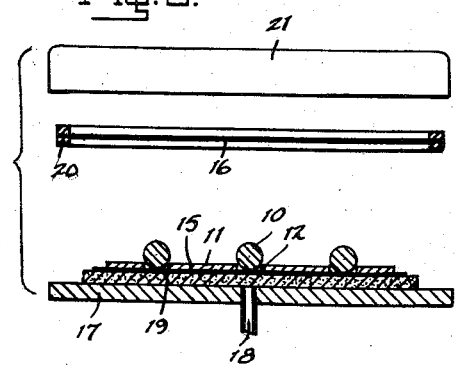
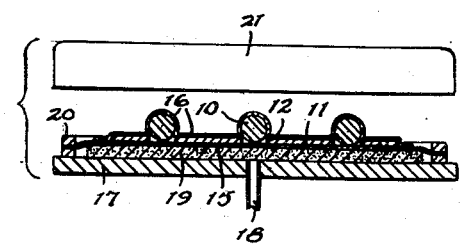
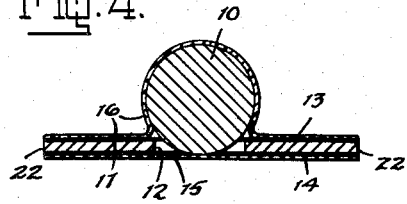
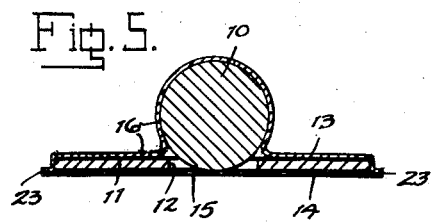
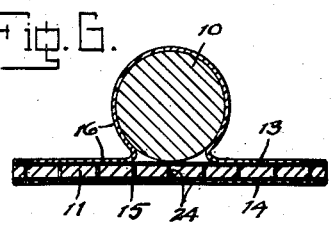
INVENTOR.
VICTOR. R. HANFORD
BY
ATTORNEY.

United States Patent Office 2,861,405
Patented Nov. 25, 1958

2,861,405
SEALED PACKAGE AND METHOD OF MAKING THE SAME

Victor R. Hanford, East Norwalk, Conn., assignor, by mesne assignments, to National Tool Company, Cleveland, Ohio, a corporation of Ohio Application December 6, 1956, Serial No. 626,655

2 Claims. (Cl. 53—22)

The present invention relates to a sealed package and method of making the same, and has for an object to provide such a package wherein one or more articles are mounted in relation to a cardboard support and are encased and protected by a plastic film or sheet molded about the articles at one side of the card and by a plastic sheet adhered to the other side of the card to provide a seal against the penetration of moisture through the card, it being pointed out that the card is of either porous nature, is provided with openings engaged by the articles, or is provided with perforations for effecting passage of air in the vacuum forming of the plastic sheet molded about the articles.

It is further proposed to provide an improved method whereby the plastic sheets at the upper and lower sides of the card are adhered thereto, and one of the sheets is molded about the articles mounted upon the card by a single continuous operation in a vacuum forming machine.

Other objects and advantages of the invention will become apparent from a consideration of the following detailed description taken in conjunction with the accompanying drawings wherein satisfactory embodiments of the invention are shown. However it will be understood that the invention is not limited to the details disclosed but includes all such variations and modifications as fall within the spirit of the invention and the scope of the appended claims.

In the drawings:

Fig. 1 is a perspective view showing the several parts of a package in separated relation, these parts consisting of two plastic sheets, a mounting card, and the articles to be packaged;

Fig. 2 is a diagrammatic vertical sectional view showing the arrangement of the parts in a vacuum forming machine prior to the vacuum forming operation;

Fig. 3 is a similar view showing the parts in the vacuum forming machine at the completion of the vacuum forming and sealing operation;

Fig. 4 is a transverse sectional view, on an enlarged scale, of a package according to one embodiment of the invention;

Fig. 5 is a similar view showing a modified form of package; and

Fig. 6 is a similar view showing another modified form of package.

Referring to the drawings, the articles 10 to be packaged are illustrated as cylindrical objects, such, for instance, as lipstick cases, although it will be understood that any desired shape of article may be packaged according to the invention. A mounting card 11, formed of cardboard or the like, is provided with a series of openings 12 substantially corresponding in outline shape to the articles, and is provided at its upper and lower surfaces with coatings of heat sensitive adhesive material 13 and 14, as shown in Fig. 4, thermoplastic films 15 and 16, as, for instance, cellulose acetate film, preferably transparent, being provided for respective adherence to the under side of the card 11 and molding over the articles and adherence to the upper side of the card. Instead of coating the card with heat sensitive adhesive material, the surfaces of the films 15 and 16 in contact with the card may be coated with heat sensitive adhesive material, or the material may be of such a character that it will be self-adhering upon the application of heat.

Figs. 2 and 3 show diagrammatically the arrangement of the parts of the package in a vacuum forming machine, such machine generally including a platen 17 provided with an opening 18 through which vacuum is applied, and a suitable porous support 19 supported upon the upper side of the platen, so that the vacuum applied through the opening 18 will draw or exhaust air through the porous support 19. A clamping frame 20, for clamping the marginal edges of the thermoplastic film 16, is disposed above the platen, and a heater 21 for heating the thermoplastic film 16 is disposed above the film, the platen being adapted to be moved upwardly into relation with the film during the vacuum forming operation.

According to the method of the invention, the thermoplastic film 15 is placed upon the porous support 19 and the card 11 is placed over the film 15, the dimensions of the card being less than the dimensions of the film 15 so that the marginal edges of the film extend beyond the marginal edges of the card. The articles 10 are placed upon the card within the openings 12 and the thermoplastic film 16 is clamped in the frame 20, the dimensions of the film 16 being substantially greater than the dimensions of the film 15 so that its marginal edges extend beyond the marginal edges of the film 15, and the dimensions of the frame 20 being such that in the raised position of the platen, as seen in Fig. 3, the frame will engage the platen in surrounding relation to the porous support 19 to seal off the support 19 for the application of vacuum.

With the parts in the position as shown in Fig. 2, the heater 21 is activated to heat the plastic film 16 to the desired state of plasticity for vacuum forming. Thereupon the platen is raised to the position as seen in Fig. 3, causing the plastic film 16 to first be draped over the articles 10 and seal off at the edges of the support 19 through engagement of the frame 20 with the platen 17, whereupon vacuum is applied through the opening 18. Because of the existence of an air space between the under side of the plastic film 15 and the upper side of the porous support 19, as well as an air space between the under side of the card 11 and the upper side of the plastice film 15, air will be drawn from the under side of the heated plastic film 16 causing it to mold about the articles, the air being drawn through the openings 12 between the surfaces of the card and the plastic film 15, between the surfaces of the plastic film 15 and the porous support 19, and through the porous support 19 to the opening 18.

Substantially simultaneously with the vacuum forming of the plastic film 16, its heated condition causes the adhesive coating 13 at the upper side of the card 11 to be activated so that the film 16 is adhered to the upper surface of the card. In order to adhere the plastic film 15 to the under surface of the card the activation of the heater 21 and the application of vacuum is continued for a sufficient period after the vacuum forming operation upon the upper sheet to cause heat to penetrate through the card 11 and to the plastic film 15, thus causing the adhesive coating 14 at the under side of the card to be activated and through atmospheric pressure due to the vacuum to adhere and seal the film 15 to the under side of the card. Thereupon the frame 20 is released from the margin of the film 16 and the package removed.

The edges of the package are thereupon trimmed by die cutting, as at 22, to remove the extended web of film at the margin of the package, and in the case of a large number of articles being simultaneously packaged upon a relatively large sheet, this sheet may be die cut into any desired number of parts. Thus a package is provided wherein the article is completely sealed, while at the same time being supported upon a cardboard support.

As shown in Fig. 5, the surplus film at the edge of the card may be trimmed at a point slightly beyond the edge of the card, as at 23, to thus provide a seal of thermoplastic film at the edge of the card.

In Fig. 6 there is shown a modified form of package in which the article is supported upon the upper side of the card, as distinguished from the embodiment shown in Figs. 4 and 5 where the article is disposed within an opening 12 in the card. In this case, in order to provide for the passage of air through the card, a plurality of perforations 24 is provided, these perforations extending completely through the card and the adhesive coatings at each side. Obviously, other means may be provided for drawing air from the upper side of the card during the vacuum molding process, for instance, the card may be of very porous material.

What is claimed is:

1. The method of forming a sealed package which comprises placing upon a vacuum applying support a sheet of thermoplastic film, placing a card having air passage means extending between its upper and lower surfaces upon said sheet, placing an article at the upper side of said sheet, supporting a second sheet of thermoplastic film above said card, applying heat to the upper side of said second sheet and vacuum forming said second heated sheet over said article and adhering said second sheet to the upper surface of said card in surrounding relation to said article to seal said air passage means at the upper side of said card, and continuing the application of heat and vacuum to said second adhered sheet and card following said vacuum forming operation upon said second sheet to cause penetration of heat to the under side of said card and adherence of said first sheet of thermoplastic film to the under side of said card to seal said air passage means at the lower side of said card.

2. The method as defined in claim 1, wherein coatings of adhesive material are applied to the upper and lower surfaces of said card, and air passage means is provided through said card and said coatings.

References Cited in the file of this patent

UNITED STATES PATENTS

| | | |
|---|---|---|
| 1,549,111 | Grollman | Aug. 11, 1925 |
| 1,970,193 | Riebel | Aug. 14, 1934 |
| 2,387,639 | Bouchelle | Oct. 23, 1945 |
| 2,750,719 | Wandelt | June 19, 1956 |
| 2,778,173 | Taunton | Jan. 22, 1957 |